United States Patent
Taylor

[15] 3,695,499
[45] Oct. 3, 1972

[54] FASTENER INSTALLATION

[72] Inventor: Philip W. Taylor, Howell, Mich.

[73] Assignee: Taylor Industries, Inc., Howell, Mich.

[22] Filed: June 9, 1971

[21] Appl. No.: 151,283

[52] U.S. Cl..................................227/52, 227/147
[51] Int. Cl. ............................................B21j 15/10
[58] Field of Search........227/51, 52, 53, 55, 60, 147, 227/149; 29/275, 278, 280, 282

[56] References Cited

UNITED STATES PATENTS 2,430,532  11/1947  Rayburn................227/147 X
3,030,849  4/1962  Bisbing et al. ...........227/52 X

*Primary Examiner*—Granville Y. Custer, Jr.
*Attorney*—Hauke, Gifford and Patalidis

[57] ABSTRACT

A manually operated installation tool for fasteners such as expansion rivets of the type provided with an expander pin normally projecting from the rivet head and adapted to be forcibly driven into the rivet shank for expanding the shank. The installation tool comprises a hollow housing in which is disposed a reciprocable plunger. One end of the housing has a bore resiliently or frictionally accepting the expander pin projecting from the rivet head, with one end of the plunger proximate the end of the rivet pin, such that the tool is used for inserting the rivet into the rivet accepting apertures of a mechanical assembly, and the expander pin is subsequently forcibly driven into the rivet shank for expanding the shank as a result of manually displacing the plunger by manually applying pressure on the other end of the plunger provided with an appropriate knob.

8 Claims, 4 Drawing Figures

PATENTED OCT 3 1972

3,695,499

INVENTOR
PHILIP W. TAYLOR

BY Hauke, Gifford & Patalidis

ATTORNEYS

FASTENER INSTALLATION

BACKGROUND OF THE INVENTION

It is common practice to utilize fasteners such as expansion rivets to assemble diverse thin metal or thin plastic parts together, or for mounting, for example, parts made of sheet metal or sheet plastic on a sheet metal or sheet plastic mounting panel. Expansion rivets are commonly made of a substantially soft metal or they are made of plastic, and they are provided with an expander pin disposed in a longitudinal bore through the rivet head and body or shank. The expander pin normally projects from the rivet head and upon being forcibly driven, as a result of impact by a hammer or a like tool, into the rivet shank which preferably is cross-slotted so as to facilitate its expansion causes the shank to expand and spread in such manner as to maintain in assembly mechanical parts provided with aligned rivet accepting apertures. Expansion rivets are used extensively at the present for attaching to a mounting panel diverse electrical components, wire harness straps, wiring guideways or ducts, and like elements. One advantage of using the expansion rivets for installing components on a panel provided with appropriate mounting apertures is that it is only necessary to have access to the rivet head on one side of the panel in order to secure the component to the panel by driving into the rivet the projecting expander pin. It is common practice to manually insert the rivet shank into the rivet accepting apertures in the component and in the panel, and to subsequently strike or hit the end of the expander pin projecting from the rivet head with a hammer, a screwdriver handle, or a like convenient tool. In narrow or cramped places it is obviously difficult to manually insert the rivet in position, and when elements are mounted on a vertical panel or on the top panel of an electrical cabinet, considerable difficulties are met in attempting to obtain correct placement of the rivets and holding of the rivets in position prior to impacting the expander pin.

The installation tool of the present invention provides a convenient means for grasping and holding an expansion rivet on the end of the tool for insertion of the rivet shank into the aligned rivet accepting apertures of an assembly and for holding the rivet securely in position during impacting of the expander pin by means of a plunger disposed in the tool housing and actuated by a convenient knob disposed on the other end of the tool so as to be accessible to the user of the tool.

The many objects and advantages of the present invention will become apparent to those skilled in the art when the following description of an example of the best mode contemplated for practicing the invention is read in conjunction with the accompanying drawings wherein:

DETAILED DESCRIPTION OF THE PREFERRED EMBODIMENTS

Figure 1:
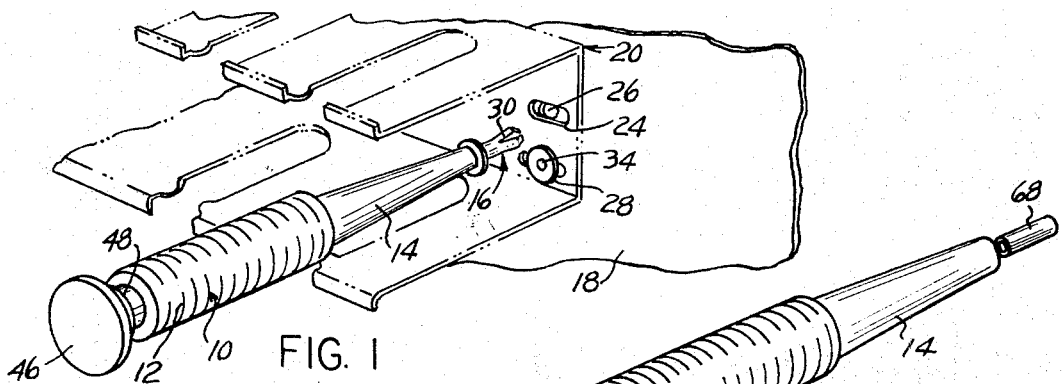
FIG. 1 is a schematic perspective view of the fastener installation tool of the invention in use for installing an expansion rivet to assemble an electrical wiring duct on a panel.
Figure 2:
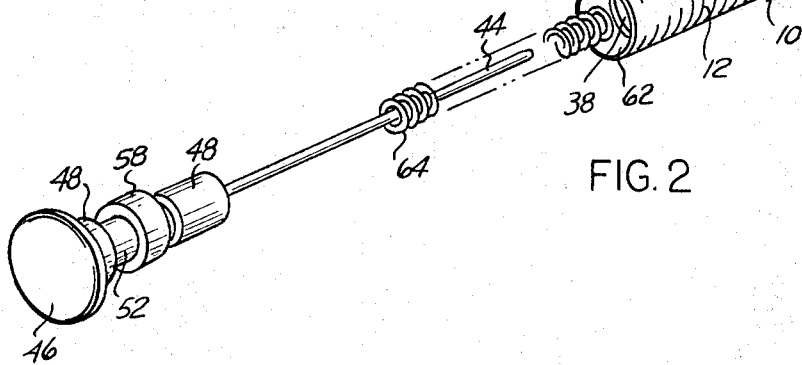
FIG. 2 is an exploded perspective view of the tool shown at FIG. 1.
Figure 3:
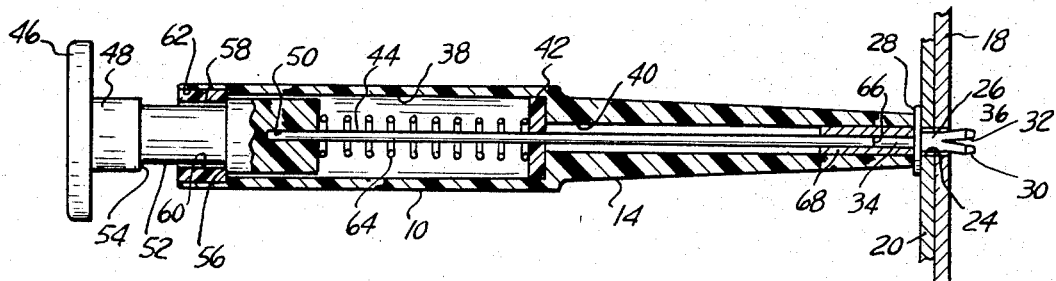
FIG. 3 is a longitudinal sectional view of the installation tool of the invention shown in the course of inserting an expansion rivet into the rivet accepting apertures of an assembly.
Figure 4:
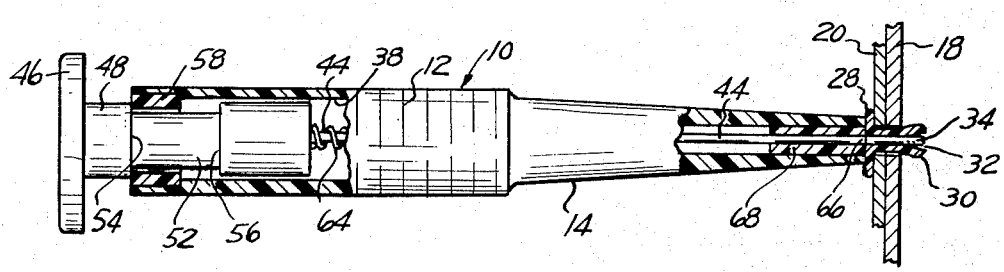
FIG. 4 is a view substantially similar to FIG. 3 but showing the installation tool of the invention while being used for driving the rivet expander pin for expanding the rivet shank.

As shown in the drawings, an example of a fastener installation tool according to the present invention takes the form of a hollow elongated housing 10 made of any convenient material such as a metallic material but preferably made of plastic for the sake of low manufacturing costs and ease of assembly. A portion of the periphery of the hosing 10 is provided with a roughened surface, as shown at 12, for the purpose of affording a better grip to the hand of the tool user. One end of the housing 10 is preferably tapered as shown at 14, so as to provide a substantially slender end permitting introducing the tool end and an expansion rivet 16 carried on the end thereof into a narrow or cramped space for inserting the rivet shank into the aligned rivet accepting apertures of an assembly. Such assembly, as illustrated at FIG. 1, may consist of a support panel schematically shown at 18 on which it is desired to mount or fasten a mechanical component which, as illustrated, consists, of a U-shaped electrical wiring channelway, duct or guideway as shown at 20. The illustrated guideway is provided with a substantially flat mounting base 22 having longitudinal extending apertures or slots 24 which are aligned with pre-drilled mounting holes 26 in the panel 18 or, alternately, the locations of the mounting apertures 24 of the guideway are marked on the panel and appropriate mounting holes 26 are drilled for mounting of the guideway thereon. The mounting of the guideway on the panel 18 is conveniently effected by means of the expansion rivets 16, made of soft metal or preferably made of a plastic which, is best seen in FIGS. 3 and 4, comprises an enlarged head 28 and an integral shank 30 provided with cross-slots as shown at 32 for the purpose of facilitating expansion of the shank after insertion thereof in the mounting aperturs 24 and 26. An expander pin 34, which normally projects from the rivet head 28, is adapted to be driven forcibly into a substantially narrow bore 36 axially disposed within the rivet shank 30. After the rivet shank 30 is inserted in the aligned mounting apertures 24 and 26, the expander pin 34 is driven flush with the surface of the rivet head 28 so as to cause expansion of the shank 30, such expansion being facilitated by the presence of the cross-slots 32 permitting the rivet shank segments between successive cross-slots to be effortlessly expanded by the expander pin 34. Such expansion rivet structure is conventional and well known in the fastener art.

The housing 10 of the installation tool has an internal bore 38, which, in the example illustrated, is separated from a reduced diameter bore portion 40 by a wall 42 through which is slidably disposed a plunger 44 in the form of a steel rod, or the like, having an outer diameter substantially equal to the outer diameter of the rivet pin 34. A handle in the form of a substantially large diameter disc or knob 46 is rigidly fastened to one end of a cylindrical member 48, the other end of which is adapted to be mounted on the end of the plunger rod 44 for example by way of the plunger rod 44 being press-fitted into an axial bore 50 formed in the cylindrical member 48 as more clearly shown at FIG. 3. The cylindrical member 48 has a reduced diameter portion 52 provided at both ends thereof with an annular abutment as shown at 54 and 56. A sleeve 58 having a bore 60 slidably accepting the reduced diameter portion 52 of the cylindrical member 48 is fastened, such as by gluing, cementing or any other convenient way, to the counterbored end 62 of the housing 10. Preferably, a coil spring 64 is mounted between the separation wall 42 and the end of the cylindrical member 48 so as to normally urge the cylindrical member 48 in a leftward direction, as shown in FIG. 3, with the annular abutment 56 thereof engaged with the right end of the sleeve member 58, thus retracting the end 66 of the plunger 44 a predetermined distance within the reduced diameter portion 40 of the housing internal bore. The length of the plunger 44 and the dimensions of the diverse elements are such that with the spring 64 retracting the plunger 44 in the position shown at FIG. 3, the end 66 of the plunger is clear of the end of a rivet expander pin 34 inserted in the end of the reduced diameter portion 40 of the tool housing bore which is provided with a holding sleeve 68 disposed therein proximate the end of the housing. The sleeve 68 is made of a resilient material such as vinyl plastic or the like and has an internal diameter slightly less than the outer diameter of the expander pin 34 such as to provide a frictional resilient engagement between the inner wall surface of the sleeve and the peripheral surface of the expander pin. In this manner an expanion rivet 16 placed on the end of the housing 10 with its expander pin 34 normally introduced into the sleeve 68 is securely held such that the tool of the invention can be used as a holding device, as shown at FIG. 1, for carrying on its end an expansion rivet 16 for introducing the shank 32 thereof into the aligned mounting apertures 24 and 26. Once the rivet is inserted in position, a moderate pressure manually applied on the disc knob 46 causes displacement of the cylindrical member 48 to the position shown at FIG. 4 wherein the annular shoulder 54 engages the right hand end of the sleeve 58 affixed to the housing end, thus in turn displacing the plunger 44 against the bias of the spring 64 to a position wherein the end 66 of the plunger is substantially flush with the surface of the rivet head 28, thus driving the rivet expander pin 34 into the rivet shank 30, for in turn expanding the shank 30 to securely hold the rivet in position in the rivet accepting apertures 24–26. The length of the reduced diameter portion 52 of the cylindrical member 48 is the permissible reciprocation stroke of the plunger 44. Because the disc knob 46 has a substantially area as compared to the area of the plunger end 66, only a small amount of pressure on the knob is required to faultlessly drive the expander pin 34 into the rivet shank 30.

It is obvious that the diverse elements forming the installation tool of the invention are designed for easy assembly and that, for example, the cylindrical member 48 is made in two parts so at to permit insertion of the sleeve or collar 58 over the reduced diameter portion 52 of the cylindrical member 48. The rivet holding sleeve 68 may be made removable and replaceable by sleeves having bores of different diameters so as to accept rivets of different sizes within a predetermined range, or the tool may be made with a demountable tip and provided with a plurality of tips each having a sleeve of a different size for accepting rivets of diverse dimensions within a predetermined range.

Having thus described the invention by way of an example of practical embodiments thereof, given for illustrative purpose only,

What is claimed as new is as follows:

1. An installation tool for installing in a rivet accepting aperture an expansion rivet of the type having a head, a shank and an expander pin normally projecting from said head and adapted to be forcibly driven in an axially aligned bore in said rivet shank for expanding said shank, said installation tool comprising an elongated housing having a bore extending axially therein, a plunger slidably disposed in said bore, a portion of said bore proximate an end of said housing having a predetermined diameter for frictional engagement of said rivet expander pin therein for holding said rivet in the end of said housing for insertion of said rivet shank in said rivet accepting aperture, and means on one end of said plunger projecting from the other end of said housing for manually reciprocating said plunger relative to said housing for causing the other end of said plunger to forcibly drive said expander pin into said rivet shank for expanding said shank to install said rivet in said rivet accepting aperture.

2. The installation tool of claim 1 further comprising spring bias means normally maintaining said plunger with the other end thereof retracted from the portion of the bore at the end of said housing adapted to accept said expander pin projecting from said rivet head.

3. The installation tool of claim 1 wherein said end bore portion of said housing adapted to accept said expander pin projecting from said rivet head is defined by a resilient material tubular insert mounted in said housing and having an inner diameter slightly smaller than the outer diameter of said expander pin.

4. The installation tool of claim 1 wherein said means on the end of said plunger projecting from said housing is a relatively large diameter knob.

5. The installation tool of claim 1 further comprising abutment means dependent from said plunger and said housing for limiting the displacement of said plunger to an amount sufficient for causing said expander pin to be driven in said rivet shank with the end of said pin normally projecting from said rivet head substantially flush with said rivet head.

6. The installation tool of claim 5 wherein said abutment means comprises a stationary sleeve mounted on the other end of said housing, a cylindrical member mounted on said first mentioned end of the plunger slidably disposed coaxially within said sleeve member and an annular shoulder proximate each end of said cylindrical member and each adapted for engagement with one of the ends of said sleeve member for limiting the reciprocation of said plunger.

7. The installation tool of claim 1 wherein a portion of said housing is peripherally provided with a roughened surface.

8. The installation tool of claim 1 wherein said housing has an end portion gradually tapering to a diameter at most equal to the diameter of said rivet head.

* * * * *